(12) United States Patent
Goto et al.

(10) Patent No.: US 8,521,470 B2
(45) Date of Patent: Aug. 27, 2013

(54) FORM MEASURING DEVICE AND METHOD OF ALIGNING FORM DATA

(75) Inventors: Tomonori Goto, Sapporo (JP); Jyota Miyakura, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 322 days.

(21) Appl. No.: 12/909,287

(22) Filed: Oct. 21, 2010

(65) Prior Publication Data
US 2011/0098971 A1   Apr. 28, 2011

(30) Foreign Application Priority Data

Oct. 22, 2009   (JP) .................................. 2009-243760

(51) Int. Cl.
*G01B 11/24*   (2006.01)
(52) U.S. Cl.
USPC ........................................................ 702/167
(58) Field of Classification Search
USPC ............. 702/167, 153; 356/2, 601; 382/149
See application file for complete search history.

(56) References Cited

U.S. PATENT DOCUMENTS

| 6,081,577 A * | 6/2000 | Webber ........................... 378/23 |
| 6,925,860 B1 | 8/2005 | Poris et al. |
| 7,701,589 B2 * | 4/2010 | Takeda et al. ................. 356/511 |
| 2003/0215053 A1 | 11/2003 | Ichihara |
| 2009/0182528 A1 | 7/2009 | De Groot et al. |

FOREIGN PATENT DOCUMENTS

WO   2006/068217   6/2006

* cited by examiner

*Primary Examiner* — Bryan Bui
(74) *Attorney, Agent, or Firm* — Rankin, Hill & Clark LLP

(57) ABSTRACT

A form measuring device includes: a measuring unit configured to detect a height at each position in a reference axis direction of a measured object and measure a cross-sectional form of the measured object; and an arithmetic unit configured to synthesize a plurality of form measurement data, obtained by repeated measurements of the form of the same measured object by the measuring unit, and calculate synthesized form measurement data. In the synthesis of the form measurement data, the arithmetic unit is configured to calculate shift amounts in the reference axis direction and a height direction of the form measurement data with respect to the synthesized form measurement data and align the form measurement data in the reference axis direction and the height direction based on the calculated shift amount.

11 Claims, 4 Drawing Sheets

FORM MEASURING DEVICE AND METHOD OF ALIGNING FORM DATA

CROSS-REFERENCE TO RELATED APPLICATIONS

This application is based upon and claims the benefit of priority from the prior Japanese Patent Application No. 2009-243760, filed on Oct. 22, 2009, the entire contents of which are incorporated herein by reference.

BACKGROUND OF THE INVENTION

1. Field of the Invention

The present invention relates to a method of aligning form data (profile data), which is obtained by a form measuring instrument, an image measuring instrument, a three-dimensional measuring instrument, and the like, and a form measuring device using the method.

2. Description of the Related Art

Conventionally, there have been known various form measuring devices which measure a three-dimensional form of an object to be measured (hereinafter, "measured object") in a noncontact manner using an optical system. Known examples of a form measuring device, which enables three-dimensional measurement of a measured object having a minute unevenness such as a micromachine and an LSI, include a white light interferometer. The white light interferometer applies white light from a white light source to a measured object and a reference surface to interfere white lights reflected from the measured object and the reference surface. The white light interferometer moves the reference surface in an optical axis direction to detect a reference surface position having the highest interfering light intensity, thereby to measure the height in the optical axis direction of the measured object based on the reference surface position (International Publication WO 2006/068217).

However, in the above conventional form measuring device, if a measured object having unevenness is measured as in line-width measurement of an IC package, there is a problem that data in the uneven portion is likely to have defect. If data has defect, stable and highly accurate measurement results cannot be obtained.

In view of the above problems, an object of the invention is to provide a form measuring device, which suppresses the influence of data defect in an uneven portion and can obtain stable and highly accurate measurement results, and a method of aligning form data.

SUMMARY OF THE INVENTION

A form measuring device according to the invention includes: a measuring unit configured to detect a height at each position in a reference axis direction of a measured object and measure a cross-sectional form of the measured object; and an arithmetic unit configured to synthesize a plurality of form measurement data obtained by repeated measurements of the form of the same measured object by the measuring unit, and calculate synthesized form measurement data, in the synthesis of the form measurement data, the arithmetic unit being configured to calculate shift amounts in the reference axis direction and a height direction of the form measurement data with respect to the synthesized form measurement data and align the form measurement data in the reference axis direction and the height direction based on the calculated shift amounts.

A form measuring device according to the invention includes an arithmetic unit, between form measurement data $I_L$ comprising data of a height at each position in a reference axis direction of a measured object and synthesized form measurement data $I_R$ obtained by synthesizing the form measurement data $I_L$, when a shift amount of a pixel (integer number) in the reference axis direction is represented as d, a shift amount of a sub-pixel (real number) in the reference axis direction is represented as $\Delta d$, and a shift amount in a height direction is represented as $\Delta z$, the arithmetic unit being configured to repeatedly perform such a calculation that two-dimensional linear simultaneous equations based on $$\sum \left\{ I_L(x+d) + \frac{dI_L(x+d)}{dx}\Delta d - I_R(x) + \Delta z \right\}^2 \to \text{Min}$$

are solved to obtain $\Delta d$ and $\Delta z$ until a predetermined convergence condition is satisfied to thereby calculate the shift amounts in the reference axis direction and the height direction, the arithmetic unit being configured to shift the form measurement data by the calculated shift amounts in the reference axis direction and the height direction and align the form measurement data with the synthesized form measurement data.

A method of aligning form data according to the invention comprises by a computer: between form measurement data $I_L$ comprising data of a height at each position in a reference axis direction of a measured object and synthesized form measurement data $I_R$ obtained by synthesizing the form measurement data $I_L$, when a shift amount of a pixel (integer number) in the reference axis direction is represented as d, a shift amount of a sub-pixel (real number) in the reference axis direction is represented as $\Delta d$, and a shift amount in a height direction is represented as $\Delta z$, repeatedly performing such a calculation that two-dimensional linear simultaneous equations based on $$\sum \left\{ I_L(x+d) + \frac{dI_L(x+d)}{dx}\Delta d - I_R(x) + \Delta z \right\}^2 \to \text{Min}$$

are solved to obtain $\Delta d$ and $\Delta z$ until a predetermined convergence condition is satisfied to thereby calculate the shift amounts in the reference axis direction and the height direction; and shifting the form measurement data by the calculated shift amounts in the reference axis direction and the height direction and aligning the form measurement data with the synthesized form measurement data.

DETAILED DESCRIPTION OF THE EMBODIMENTS

Next, a form measuring device and a form measuring method according an embodiment of the invention will be described in detail.

Figure 1:
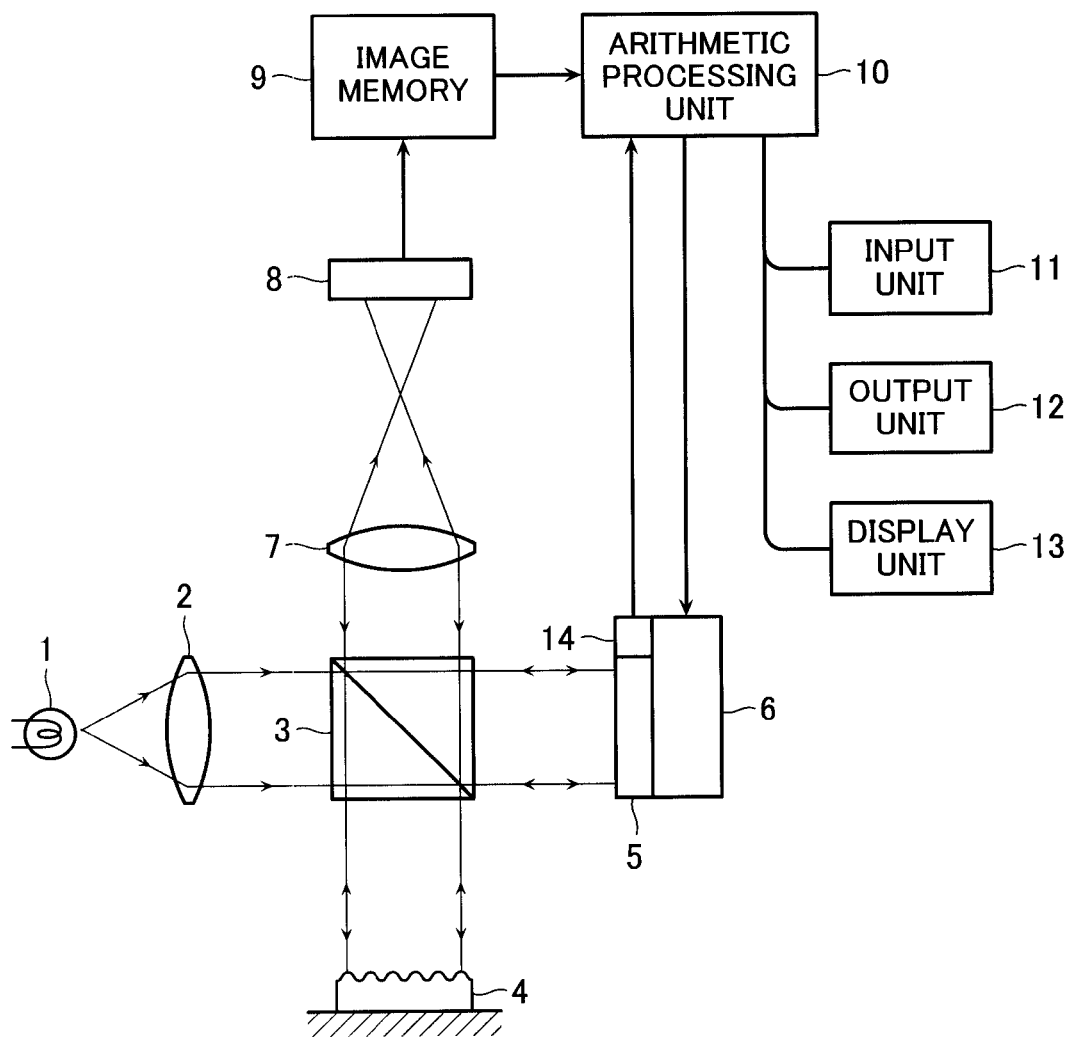
FIG. 1 is a block diagram showing a constitution of a form measuring device according to a first embodiment of the invention.

FIG. 1 is a view showing a constitution of a white light interferometer which is the form measuring device according to the present embodiment. In the present embodiment, although the white light interferometer is a Michelson interferometer, other equal optical path interferometers such as a Mirau interferometer may be used. The interferometer may be used with another optical measuring device such as an image measuring device.

A light source 1 is a white light source having a broadband spectrum, such as a halogen lamp, a xenon lamp, a mercury lamp, a metal-halide lamp, and an LED. White light emitted from the light source 1 is collimated by a collimator lens 2 to be divided into two directions by a beam splitter 3. One of the divided lights is applied to a measurement surface of a workpiece 4 which is an object to be measured, and the other is applied to a reference surface of a reference plate 5. The white light reflected from the measurement surface and the white light reflected from the reference surface are synthesized by the beam splitter 3, and interfering light at this time is imaged by a CCD camera 8 through an imaging lens 7.

The reference plate 5 is moved and scanned in the optical axis direction by a drive unit 6 such as a piezoelectric element, and an interference image at each scanning position is sampled by the CCD camera 8 to be stored in an image memory 9. An arithmetic processing unit 10 obtains form measurement data (hereinafter referred to as "surface data") of the measurement surface of the workpiece 4 based on the intensity of the interfering light at each position of the measurement surface of the workpiece 4, and the scanning position of the reference plate 5 input from an encoder 14. Then, the arithmetic processing unit 10 extracts cross-section data (hereinafter referred to as "profile data") from the surface data. An input unit 11 inputs data required for measurement to the arithmetic processing unit 10. An output unit 12 outputs measurement results obtained by the arithmetic processing unit 10. A display unit 13 displays information required for input operation and measurement results.

Next, a profile measurement method by the white light interferometer will be described.

Figure 2:
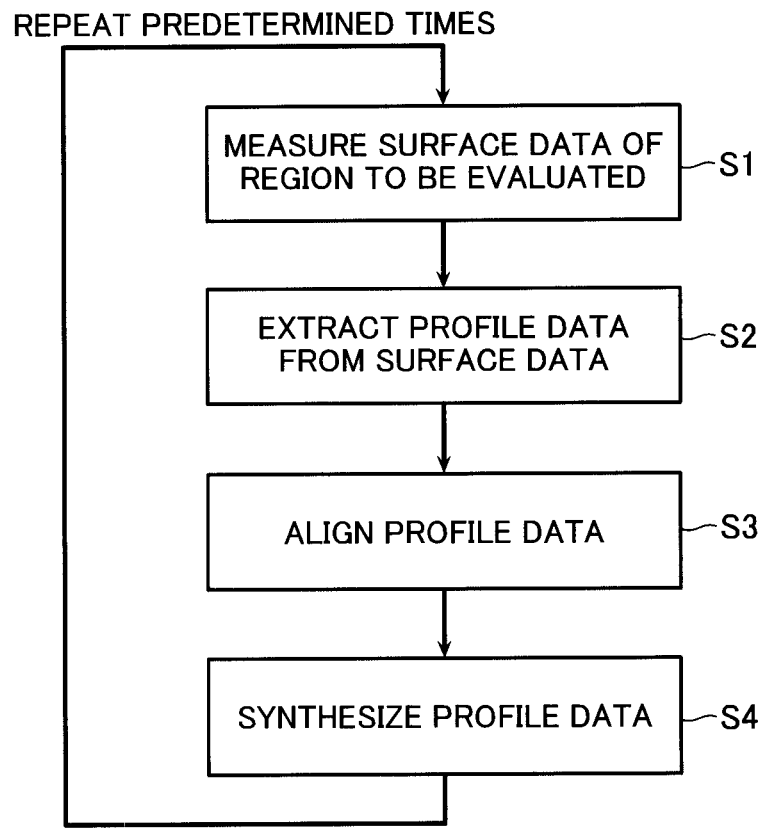
FIG. 2 is a flowchart showing an operation of an arithmetic processing unit in the form measuring device.

FIG. 2 is a flowchart showing a measurement processing in the arithmetic processing unit 10. The processing in the arithmetic processing unit 10 includes: a process of measuring the surface data in a region to be evaluated of the measurement surface of the workpiece 4 (S1); a process of extracting profile data from the measured surface data (S2); a process of aligning the profile data obtained in the current measurement with the profile data obtained in previous measurements (S3); and a process of synthesizing the aligned current profile data with the profile data obtained in previous measurements (S4), and these processes S1 to S4 are repeated predetermined times. Hereinafter, each process will be described in detail.

(1) Surface data measurement processing of region to be evaluated (S1) and extraction processing of profile data (S2)

Figure 3:
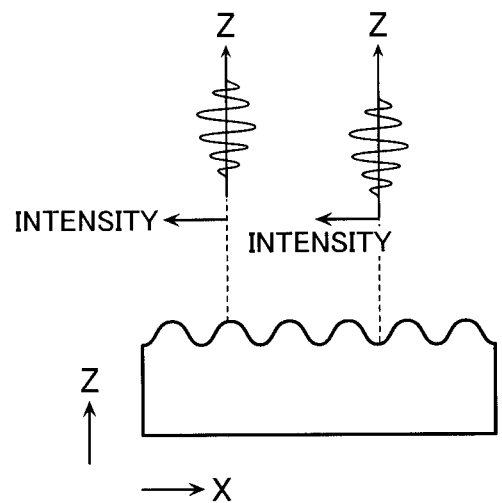
FIG. 3 is a view for explaining a method of measuring a cross-sectional form in the form measuring device.

The white light from the light source 1 is reflected on the measurement surface of the workpiece 4 and the reference surface of the reference plate 5 to be synthesized by the beam splitter 3. The interfering intensity at that time is changed by moving or scanning the reference plate 5 in the optical axis direction by the piezoelectric element 6. By virtue of the use of low coherent white light, a range where an interference pattern is generated can be narrowed. According to this constitution, for example, as shown in FIG. 3, a change of interfering light intensity at each position of the measurement surface caused by the movement or scanning of the reference surface occurs at a phase corresponding to the height of the measurement surface (a Z direction position). Therefore, the scanning position on the reference surface, where the peak value of the change in the interfering light intensity at each position of the measurement surface is observed, can be obtained as the height of the corresponding portion of the measurement surface.

Figure 4:
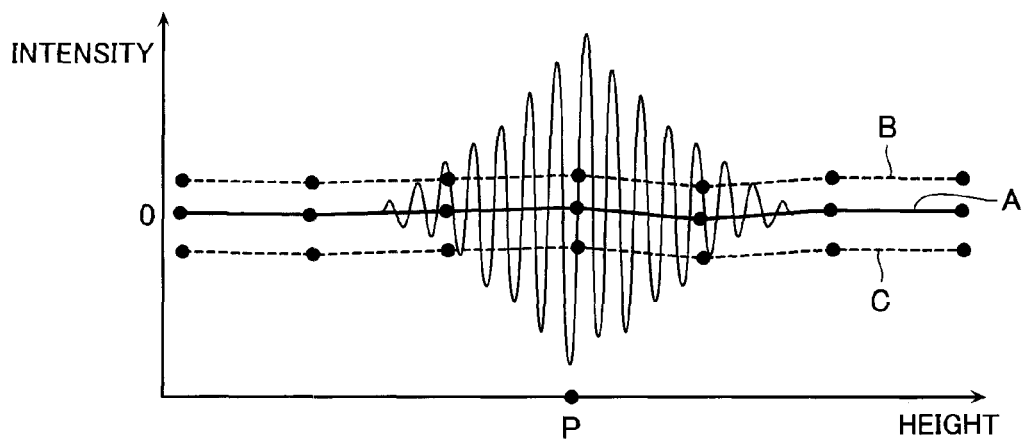
FIG. 4 is a view for explaining the method of measuring a cross-sectional form.

FIG. 4 is a view for explaining an example of a processing of obtaining the peak position of the change in the interfering light intensity from the change in the interfering light intensity at each position. In this processing, a predetermined geometric element (for example, a straight line or a curve) A is fitted to an interfering light intensity column obtained by moving and scanning the reference surface. Alternatively, the obtained interfering light intensity column is smoothed to obtain the geometric element (for example, a straight line or a curve) A. Next, the obtained geometric elements A are shifted in plus and minus directions of a intensity axis, and threshold levels B and C are set. The interfering light intensity exceeding the threshold levels is obtained as a peak position candidate point. Then, a barycenter of a region where the peak position candidate points are most densely located is obtained as a peak position P. By virtue of this processing, the peak position P can be obtained at high speed, reducing the number of processing points. The peak position P obtained as described above corresponds to the height (Z value) at the measurement point. By obtaining the Z value at each position on the measurement surface, the surface data of the workpiece 4 can be obtained. The profile data on a certain cross section can be obtained by extracting data in an arbitrary direction from the surface data (S2).

(2) Alignment of Profile Data (S3)

When the uneven workpiece 4 is measured by the white light interferometer as in line-width measurement of an IC chip, the data in the uneven portion is likely to have defect. Thus, there occur such problems that the number of data sufficient for the line-width measurement cannot be obtained, and stable line-width values cannot be obtained in repeated measurements.

Thus, in the present embodiment, when a certain region is a region to be evaluated, a plurality of cross-sectional data required for the line-width measurement are obtained to be synthesized, whereby the number of the defect portions of unevenness is reduced, so that stable line-width values can be obtained even in repeated measurements (S4).

However, the workpiece 4 is not always placed horizontally, and therefore, before synthesis of the cross sections, it is essential to align some taken cross sections. In this case, the more the number of the cross sections to be processed, the better, because the number of defect portions is reduced. Thus, depending on a workpiece, the number of the cross sections may be considerably increased, and thus some ingenuity is required for the alignment processing. For this type of alignment method, a best-fitting processing using a shortest distance has been known. However, in the best-fitting processing, since the calculation amount is large, it is slightly difficult to realize a real-time processing in a production line.

Thus, a stereo matching method is expanded, and a high-speed alignment processing between profile data is realized.

Hereinafter, the alignment processing will be described.

[Basic Principle]

Generally, in the stereo matching method between two images, one data is represented as $I_L$, and the other data is represented as $I_R$. When $I_L$ is moved to be fitted to $I_R$, d is defined as a shift amount of a pixel (integer number), and $\Delta d$ as a shift amount of a sub-pixel (real number). In this case, the approximation can be realized as follows, using a Taylor expansion:

$$I_L(x+d+\Delta d) \approx I_L(x+d) + \frac{dI_L(x+d)}{dx}\Delta d. \qquad (1)$$

If an evaluation amount $\phi$ is defined as $$\phi = \rho\{I_L(x+d+\Delta d) - I_R(x)\}^2 \qquad (2),$$

the following formula (3) is obtained from the formula (1):

$$\sum\{I_L(x+d+\Delta d) - I_R(x)\}^2 \approx \qquad (3)$$
$$\sum\left\{I_L(x+d) + \frac{dI_L(x+d)}{dx}\Delta d - I_R(x)\right\}^2;$$

therefore, $\Delta d$ satisfying the following formula (4) only needs to be obtained:

$$\sum\left\{I_L(x+d) + \frac{dI_L(x+d)}{dx}\Delta d - I_R(x)\right\}^2 \to \text{Min}. \qquad (4)$$

In the above method, although the alignment in an X direction can be performed, the alignment in a Z direction cannot be performed. Thus, in the above formula, the value $I_L$ in the Z direction is represented as $I_L+\Delta Z$, and it is considered that the alignment in the Z direction is performed at the same time. In this case, $\Delta d$ and $\Delta Z$ satisfying the flowing formula (5) only need to be obtained:

$$\sum\left\{I_L(x+d) + \frac{dI_L(x+d)}{dx}\Delta d - I_R(x) + \Delta z\right\}^2 \to \text{Min}. \qquad (5)$$

Since the formula (5) is reduced to the problem of solving simple two-dimensional linear simultaneous equations, the computation load is very low. In the application to an actual problem, the formula (5) is repeatedly solved, and the final solution may be obtained while updating an amount of movement.

[Practical Algorithm Considering Discretization (Sampling) in X Direction]

In normal measurement, Z value data is sampled in the X direction with a constant sampling interval, and therefore when the formula (5) is solved, if the calculation is performed considering the integer part of the result of the division of the movement amount in the X direction with a constant sampling interval and the real part of the remainder, the solution can be obtained with high accuracy.

Figure 5:
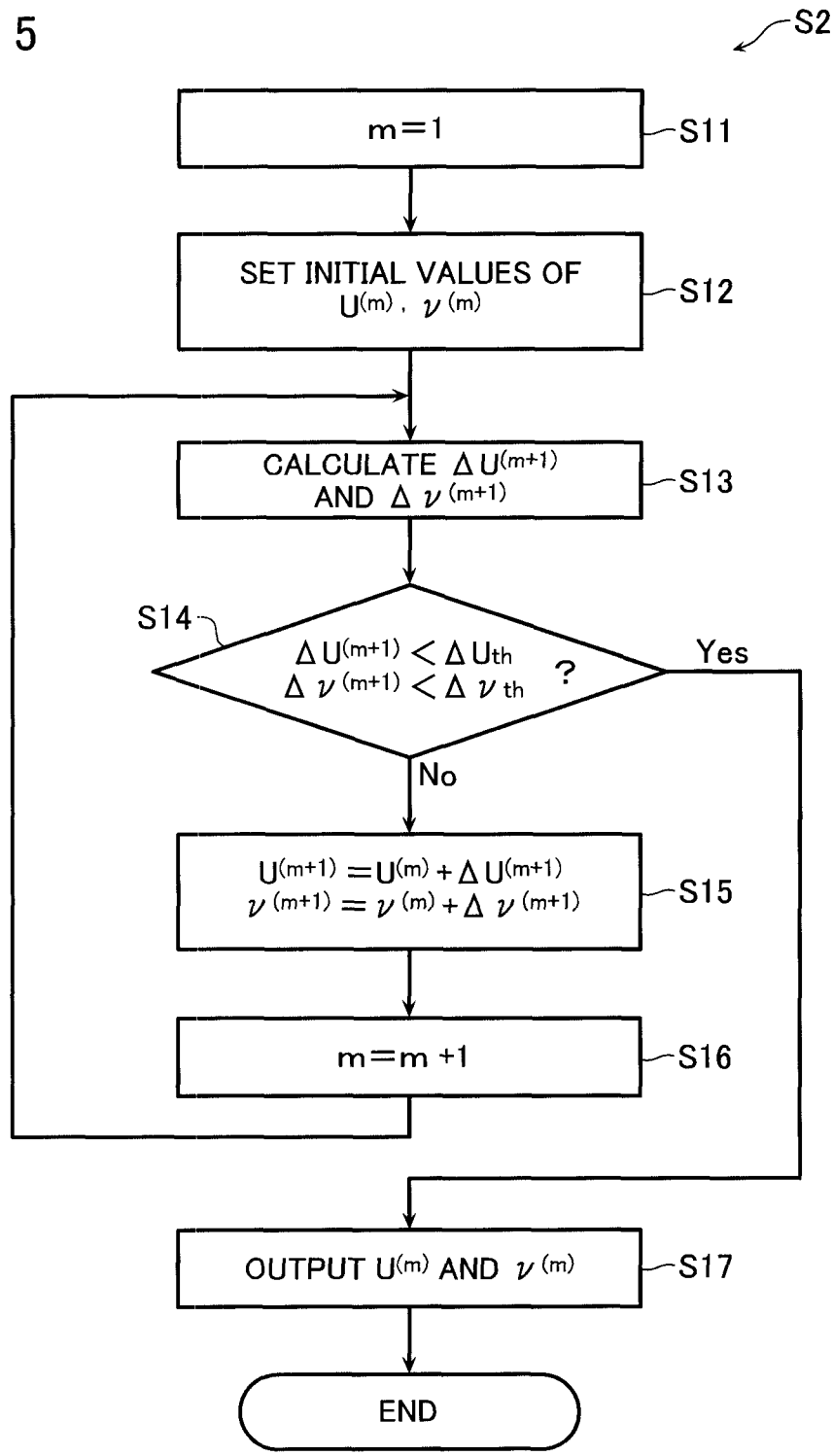
FIG. 5 is a flowchart for explaining an alignment processing in the synthesis of measurement data of a cross-sectional form in the form measuring device.

FIG. 5 is a flowchart showing a processing of obtaining the actual movement amounts in the X and Z directions.

First, "1" as an initial value is substituted into a repetition frequency m (S11).

Here, the movement amounts in the X and Z directions after the repetition of m times are expressed respectively as $u^{(m)}$ and $v^{(m)}$, and their initial values are set (S12). The initial value may be set so that the barycentric positions of two profile data coincide with each other, for example, or may be set so that specified data points (for example, the peak values of the profile data) coincide with each other. With regard to two data which do not deviate so much, the initial value may be 0.

Next, amounts of correction $\Delta u^{(m+1)}$ and $\Delta v^{(m+1)}$ of the movement amounts in each axial direction in each calculation cycle of the repeated calculations of the movement amount $u^{(m)}$ in the X direction and the movement amount $v^{(m)}$ in the Z direction are calculated as follows (S13).

The integer part of the result of the division of the movement amount $u^{(m)}$ in the X direction with a sampling interval is $u^{(m)}_d$, and the real part of the remainder is $u^{(m)}_{\Delta d}$. More commonly, when considering the weight of a data point on the $I_L$ side as $w_L$, and considering the weight of a data point on the $I_R$ side as $w_R$, the formula (5) is the following formula (6):

$$\sum w_L(x+u_d^{(m)})w_R(x) \qquad (6)$$
$$\left\{I_L(x+u_d^{(m)}) + \frac{dI_L(x+u_d^{(m)})}{dx}(u_{\Delta d}^{(m)} + \Delta u^{(m+1)}) - I_R(x) + v^{(m)} + \Delta v^{(m+1)}\right\}^2$$
$$\to \text{Min}.$$

Thus, the correction amounts $\Delta u^{(m+1)}$ and $\Delta v^{(m+1)}$ can be obtained by solving the following formula (7):

$$\begin{pmatrix} \sum w_L(x+u_d^{(m)})w_R(x) & \sum w_L(x+u_d^{(m)})w_R(x) \\ \left\{\frac{dI_L(x+u_d^{(m)})}{dx}\right\}^2 & \frac{dI_L(x+u_d^{(m)})}{dx} \\ \sum w_L(x+u_d^{(m)})w_R(x) & \\ \frac{dI_L(x+u_d^{(m)})}{dx} & \sum w_L(x+u_d^{(m)})w_R(x) \end{pmatrix} \begin{pmatrix} \Delta u^{(m+1)} \\ \Delta v^{(m+1)} \end{pmatrix} = \qquad (7)$$

$$\begin{pmatrix} -\sum w_L(x+u_d^{(m)})w_R(x) \\ \left\{I_L(x+u_d^{(m)}) - I_R(x) + \frac{dI_L(x+u_d^{(m)})}{dx}u_{\Delta d}^{(m)} + v^{(m)}\right\} \\ \frac{dI_L(x+u_d^{(m)})}{dx} \\ -\sum w_L(x+u_d^{(m)})w_R(x) \\ \left\{I_L(x+u_d^{(m)}) - I_R(x) + \frac{dI_L(x+u_d^{(m)})}{dx}u_{\Delta d}^{(m)} + v^{(m)}\right\} \end{pmatrix}.$$

In the application to the measurement data, calculation may be performed by replacing a differential with a difference. When the correction amounts $\Delta u^{(m+1)}$ and $\Delta v^{(m+1)}$ are obtained, the movement amount in each axial direction is updated by the following formula (8) (S15):

$$u^{(m+1)} = u^{(m)} + \Delta u^{(m+1)}$$
$$v^{(m+1)} = v^{(m)} + \Delta v^{(m+1)} \qquad (8).$$

It is determined that m←m+1 (S16), and updating is sequentially performed until $\Delta u^{(m+1)}$ and $\Delta v^{(m+1)}$ become satisfactorily small, whereby the final solution is reached (S14, S17).

(3) Synthesis of Profile Data (S4)

In a processing of synthesizing profile data (S4), newly obtained profile data is shifted in the X and Z directions by the movement amounts $u^{(m)}$ and $v^{(m)}$ in the X and Z directions obtained by the above processing and then synthesized with previously synthesized profile data.

Figure 6A:
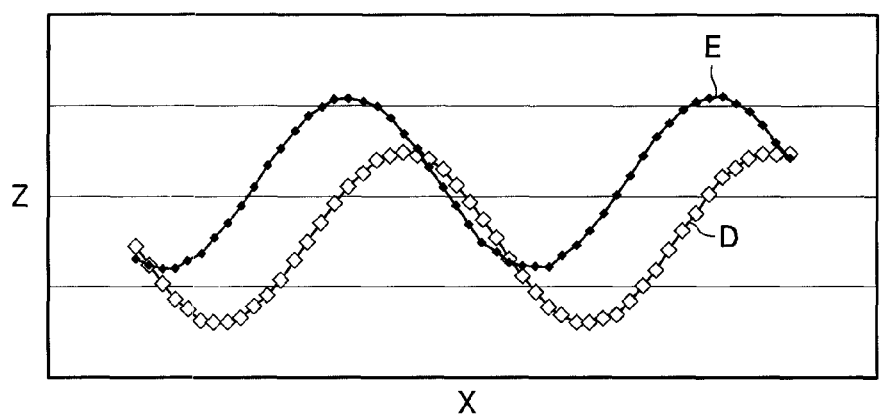
FIGS. 6A and 6B are views showing results of the alignment processing.
Figure 6B:
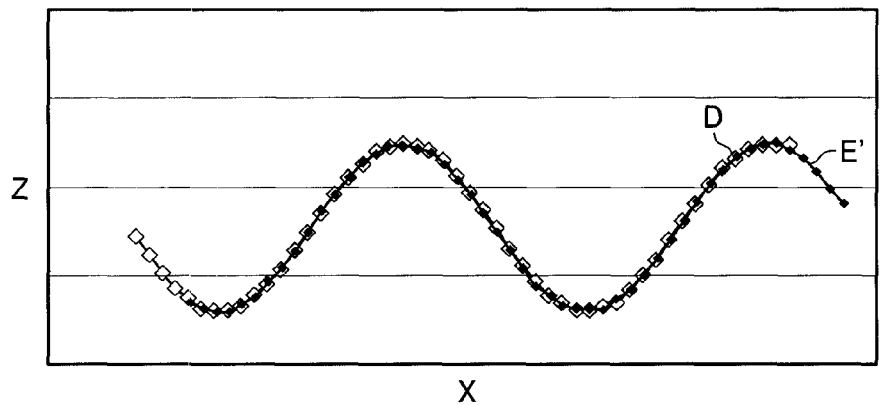

FIG. 6A shows a state in which newly obtained profile data E is shifted in the X and Z directions with respect to original profile data D. FIG. 6B shows a state in which the profile data E is shifted in the X and Z directions as shown by E' by the above method to be superposed on the original profile data D.

As shown in FIGS. 6A and 6B, by virtue of the above stereo matching processing, the profile data can be superposed at high speed and with high accuracy; therefore, the influence of data defect in an uneven portion is suppressed, and stable and highly accurate measurement results can be obtained.

The above point will be described in more detail. As the matching of the profile data, there has been known a best-fitting processing for obtaining a shortest distance and the like. However, in the best-fitting processing, substantially the same objects are to be compared and aligned, such as between a design value and measurement data in an appropriate portion and between measurement data obtained by measuring the same position. Therefore, a complex and advanced processing such as shortest distance calculation with a design value and making data corresponding to each other is required.

Meanwhile, the data alignment between profile data utilizing stereo matching is basically applied to some image measurement data with the same measured object and is applied only to the X direction of a pixel (see, "Stereo Matching by Adaptive Window Based on Statistical Model—Analysis and Experiments Using One-dimensional Signal," by Okutomi and Kanade, The Institute of Electronics, Information and Communication Engineers Paper D-11, Vol. J74-D-11, No. 6, pp 669-677, 1991). Thus, the data alignment is used only for the limited purpose.

In the present embodiment, theoretical extension is attempted so that not only the image measurement data but also two profile data measured at the same pitch are aligned with each other in the both X and Z directions, whereby a simple and high-speed processing can be realized.

In the above embodiment, although the invention is applied to the white light interferometer, the invention may be obviously applied to other form measuring devices such as an image measuring device and a laser displacement gauge.

What is claimed is:

1. A form measuring device comprising:
a measuring unit configured to detect a height at each position in a reference axis direction of a measured object and measure a cross-sectional form of the measured object, the reference axis being perpendicular to a height direction of the measured object; and
an arithmetic unit configured to synthesize a plurality of form measurement data of the cross-sectional form obtained by repeated measurements of the form of the same measured object by the measuring unit, and calculate synthesized form measurement data,
in the synthesis of the form measurement data of the cross-sectional form, the arithmetic unit being configured to calculate shift amounts between the form measurement data of the cross-sectional form and the synthesized form measurement data in the reference axis direction and the height direction and align the form measurement data in the reference axis direction and the height direction based on the calculated shift amounts.

2. The form measuring device according to claim 1, wherein the measuring unit comprises:
a light source having a broadband spectrum;
an optical system configured to guide light from the light source to the measured object and a reference surface, synthesize lights reflected from the measured object and the reference surface, and to thereby generate an interfering light intensity distribution image showing an interfering light intensity changed by an optical path length difference between a first optical path length from the light source to the measured object and a second optical path length from the light source to the reference surface, the interfering light intensity corresponding to each measurement position in a measurement surface of the measured object;
an imaging unit configured to image the interfering light intensity distribution image output from the optical system;
an optical path length changing unit configured to change a difference of the optical path length between the first optical path length and the second optical path length; and
an image storage unit configured to sequentially store the interfering light intensity distribution images changed with a change in the difference of the optical path length imaged by the imaging unit,
wherein the arithmetic unit is configured to obtain a peak value of a change in the interfering light intensity from an interfering light intensity column showing the change in the interfering light intensity with the change in the optical path length difference at each measurement position of the interfering light intensity distribution image stored in the image storage unit, obtain, as a height of the measured object, a position in the optical axis direction at each measurement position of the measured object where the peak value is obtained, and obtain a height at each position in a predetermined reference axis direction perpendicular to the optical axis direction.

3. The form measuring device according to claim 2, wherein the arithmetic unit is configured to obtain, as a candidate point of a peak position, a position of the interfering light intensity column where the interfering light intensity exceeding a predetermined threshold value is obtained, and obtain the height based on a barycenter of a region where the candidate points of the peak position are most densely located.

4. The form measuring device according to claim 3, wherein the arithmetic unit is configured to fit a predetermined geometric element to the interfering light intensity column and shift the geometric element in a plus or minus direction of an intensity axis direction to thereby set the threshold value.

5. The form measuring device according to claim 4, wherein the arithmetic unit is configured to smooth the interfering light intensity to thereby calculate the geometric element.

6. A form measuring device comprising:
a measuring unit configured to detect a height at each position in a reference axis direction of a measured object and measure a cross-sectional form of the measured object; and an arithmetic unit configured to synthesize a plurality of form measurement data obtained by repeated measurements of the form of the same measured object by the measuring unit, and calculate synthesized form measurement data, in the synthesis of the form measurement data, the arithmetic unit being configured to calculate shift amounts between the form measurement data and the synthesized form measurement data in the reference axis direction and a height direction of the measured object and align the form measurement data in the reference axis direction and the height direction based on the calculated shift amounts, wherein when the form measurement data is represented as $I_L$ and the synthesized form measurement data obtained by synthesizing the form measurement data $I_L$ is represented as $I_R$, a shift amount of a pixel (integer number) in the reference axis direction (x direction) is represented as d, a shift amount of a sub-pixel (real number) in the reference axis direction is represented as $\Delta d$, and a shift amount in the height direction is represented as $\Delta z$, the arithmetic unit is configured to repeatedly perform such a calculation that two-dimensional linear simultaneous equations based on $$\sum \left\{ I_L(x+d) + \frac{dI_L(x+d)}{dx}\Delta d - I_R(x) + \Delta z \right\}^2 \to \text{Min}$$

are solved to obtain $\Delta d$ and $\Delta z$ until a predetermined convergence condition is satisfied to thereby calculate the shift amounts in the reference axis direction and the height direction.

7. The form measuring device according to claim 6, wherein when a movement amount in the reference axis direction and a movement amount in the height direction after the repetition of m times are represented respectively as $u^{(m)}$ and $v^{(m)}$, amounts of correction of the movement amounts in each axial direction in each calculation cycle of the repeated calculations of $u^{(m)}$ and $v^{(m)}$ are represented respectively as $\Delta u^{(m+1)}$ and $\Delta v^{(m+1)}$, an integer part of a result of division of $u^{(m)}$ with a sampling interval is represented as $u^{(m)}_d$, and a real part of a remainder is represented as $u^{(m)}_{\Delta d}$, and a weight of a data point on the $I_L$ side is represented as $w_L$, and a weight of a data point on the $I_R$ side is represented as $w_L$, the arithmetic unit is configured to solve $$\begin{pmatrix} \sum w_L(x+u_d^{(m)})w_R(x) \left\{\frac{dI_L(x+u_d^{(m)})}{dx}\right\}^2 & \sum w_L(x+u_d^{(m)})w_R(x) \frac{dI_L(x+u_d^{(m)})}{dx} \\ \sum w_L(x+u_d^{(m)})w_R(x) \frac{dI_L(x+u_d^{(m)})}{dx} & \sum w_L(x+u_d^{(m)})w_R(x) \end{pmatrix} \begin{pmatrix} \Delta u^{(m+1)} \\ \Delta v^{(m+1)} \end{pmatrix} =$$

$$\begin{pmatrix} -\sum w_L(x+u_d^{(m)})w_R(x) \\ \left\{ I_L(x+u_d^{(m)}) - I_R(x) + \frac{dI_L(x+u_d^{(m)})}{dx}u_{\Delta d}^{(m)} + v^{(m)} \right\} \\ \frac{dI_L(x+u_d^{(m)})}{dx} \\ -\sum w_L(x+u_d^{(m)})w_R(x) \\ \left\{ I_L(x+u_d^{(m)}) - I_R(x) + \frac{dI_L(x+u_d^{(m)})}{dx}u_{\Delta d}^{(m)} + v^{(m)} \right\} \end{pmatrix}$$

to thereby obtain the correction amounts $\Delta u^{(m+1)}$ and $\Delta v^{(m+1)}$, correct the movement amounts $u^{(m)}$ and $v^{(m)}$ until the correction amounts $\Delta u^{(m+1)}$ and $\Delta v^{(m+1)}$ are smaller than a predetermined value, and repeat the calculation processing.

8. A form measuring device comprising:

an arithmetic unit configured to repeatedly perform such a calculation that two-dimensional linear simultaneous equations based on $$\sum \left\{ I_L(x+d) + \frac{dI_L(x+d)}{dx}\Delta d - I_R(x) + \Delta z \right\}^2 \to \text{Min}$$

are solved to obtain $\Delta d$ and $\Delta z$ until a predetermined convergence condition is satisfied to thereby calculate shift amounts in a reference axis direction and a height direction of a measured object where form measurement data comprising data of a height at each position in the reference axis direction of the measured object is represented as $I_L$, synthesized form measurement data obtained by synthesizing the form measurement data $I_L$ is represented as $I_R$, a shift amount of a pixel (integer number) in the reference axis direction is represented as d, a shift amount of a sub-pixel (real number) in the reference axis direction is represented as $\Delta d$, and a shift amount in the height direction is represented as $\Delta z$, the arithmetic unit being configured to shift the form measurement data by the calculated shift amounts in the reference axis direction and the height direction and align the form measurement data with the synthesized form measurement data.

9. The form measuring device according to claim 8, wherein when a movement amount in the reference axis direction and a movement amount in the height direction after the repetition of m times are represented respectively as $u^{(m)}$ and $v^{(m)}$, amounts of correction of the movement amounts in each axial direction in each calculation cycle of the repeated calculations of $u^{(m)}$ and $v^{(m)}$ are represented respectively as $\Delta u^{(m+1)}$ and $\Delta v^{(m+1)}$, an integer part of a result of division of $u^{(m)}$ with a sampling interval is represented as $u^{(m)}_d$, and a real part of a remainder is represented as $u^{(m)}_{\Delta d}$, and a weight of a data point on the $I_L$ side is represented as $w_L$, and a weight of a data point on the $I_R$ side is $w_R$, the arithmetic unit is configured to solve $$\begin{pmatrix} \sum w_L(x+u_d^{(m)})w_R(x) \left\{\frac{dI_L(x+u_d^{(m)})}{dx}\right\}^2 & \sum w_L(x+u_d^{(m)})w_R(x) \frac{dI_L(x+u_d^{(m)})}{dx} \\ \sum w_L(x+u_d^{(m)})w_R(x) \frac{dI_L(x+u_d^{(m)})}{dx} & \sum w_L(x+u_d^{(m)})w_R(x) \end{pmatrix} \begin{pmatrix} \Delta u^{(m+1)} \\ \Delta v^{(m+1)} \end{pmatrix} =$$

$$\begin{pmatrix} -\sum w_L(x+u_d^{(m)})w_R(x) \\ \left\{I_L(x+u_d^{(m)})-I_R(x)+\frac{dI_L(x+u_d^{(m)})}{dx}u_{\Delta d}^{(m)}+v^{(m)}\right\} \\ \frac{dI_L(x+u_d^{(m)})}{dx} \\ -\sum w_L(x+u_d^{(m)})w_R(x) \\ \left\{I_L(x+u_d^{(m)})-I_R(x)+\frac{dI_L(x+u_d^{(m)})}{dx}u_{\Delta d}^{(m)}+v^{(m)}\right\} \end{pmatrix}$$

to thereby obtain the correction amounts $\Delta u^{(m+1)}$ and $\Delta v^{(m+1)}$, correct the movement amounts $u^{(m)}$ and $v^{(m)}$ until the correction amounts $\Delta u^{(m+1)}$ and $\Delta v^{m+1)}$ are smaller than a predetermined value, and repeat the calculation processing.

10. A method of aligning form data comprising:

when form measurement data comprising data of a height at each position in a reference axis direction of a measured object is represented as $I_L$, synthesized form measurement data obtained by synthesizing the form measurement data $I_L$ is represented as $I_R$, a shift amount of a pixel (integer number) in the reference axis direction is represented as d, a shift amount of a sub-pixel (real number) in the reference axis direction is represented as $\Delta d$, and a shift amount in a height direction is represented as $\Delta z$, repeatedly performing such a calculation that two-dimensional linear simultaneous equations based on $$\sum \left\{I_L(x+d)+\frac{dI_L(x+d)}{dx}\Delta d - I_R(x)+\Delta z\right\}^2 \to \text{Min}$$

are solved to obtain $\Delta d$ and $\Delta z$ until a predetermined convergence condition is satisfied to thereby calculate the shift amounts in the reference axis direction and the height direction; and shifting the form measurement data by the calculated shift amounts in the reference axis direction and the height direction and aligning the form measurement data with the synthesized form measurement data.

11. The method of aligning form data according to claim 10, wherein when a movement amount in the reference axis direction and a movement amount in the height direction after the repetition of m times are represented respectively as $u^{(m)}$ and $v^{(m)}$, amounts of correction of the movement amounts in each axial direction in each calculation cycle of the repeated calculations of $u^{(m)}$ and $v^{(m)}$ are represented respectively as $\Delta u^{(m+1)}$ and $\Delta v^{(m+1)}$, an integer part of a result of division of $u^{(m)}$ with a sampling interval is represented as $u^{(m)}_d$, and a real part of a remainder is represented as $u^{(m)}_{\Delta d}$, and a weight of a data point on the $I_L$ side is represented as $w_L$, and a weight of a data point on the $I_R$ side is represented as $w_R$, $$\begin{pmatrix} \sum w_L(x+u_d^{(m)})w_R(x) \left\{\frac{dI_L(x+u_d^{(m)})}{dx}\right\}^2 & \sum w_L(x+u_d^{(m)})w_R(x) \frac{dI_L(x+u_d^{(m)})}{dx} \\ \sum w_L(x+u_d^{(m)})w_R(x) \frac{dI_L(x+u_d^{(m)})}{dx} & \sum w_L(x+u_d^{(m)})w_R(x) \end{pmatrix} \begin{pmatrix} \Delta u^{(m+1)} \\ \Delta v^{(m+1)} \end{pmatrix} =$$

$$\begin{pmatrix} -\sum w_L(x+u_d^{(m)})w_R(x) \\ \left\{I_L(x+u_d^{(m)})-I_R(x)+\frac{dI_L(x+u_d^{(m)})}{dx}u_{\Delta d}^{(m)}+v^{(m)}\right\} \\ \frac{dI_L(x+u_d^{(m)})}{dx} \\ -\sum w_L(x+u_d^{(m)})w_R(x) \\ \left\{I_L(x+u_d^{(m)})-I_R(x)+\frac{dI_L(x+u_d^{(m)})}{dx}u_{\Delta d}^{(m)}+v^{(m)}\right\} \end{pmatrix}$$

is solved by a computer, whereby the correction amounts $\Delta u^{(m+1)}$ and $\Delta v^{(m+1)}$ are obtained, the movement amounts $u^{(m)}$ and $v^{(m)}$ are corrected until the correction amounts $\Delta u^{(m+1)}$ and $\Delta v^{(m+1)}$ are smaller than a predetermined value, and the calculation processing is repeated.

* * * * *